INVENTORS
DEAN D. HOWARD
BERNARD L. LEWIS

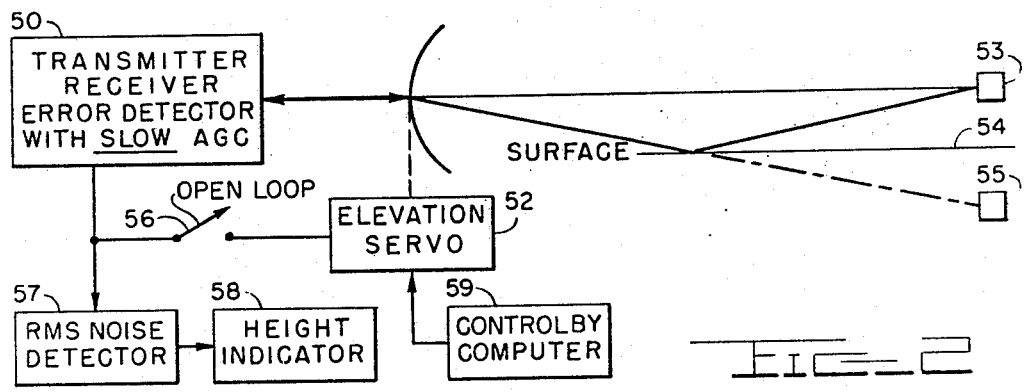
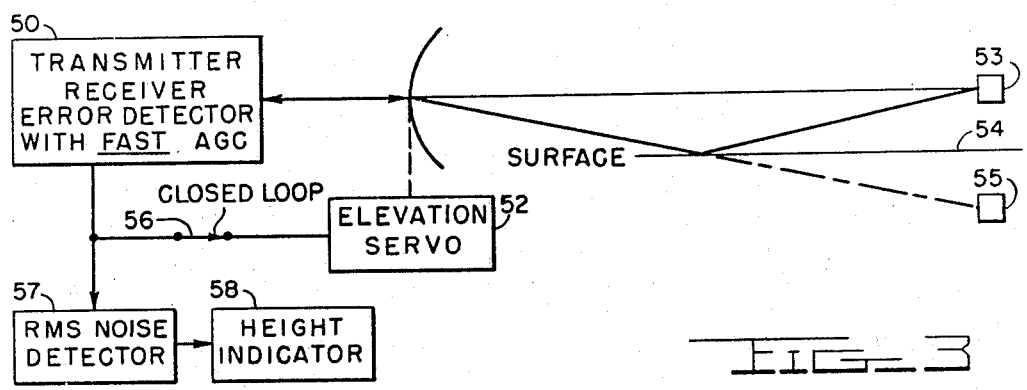
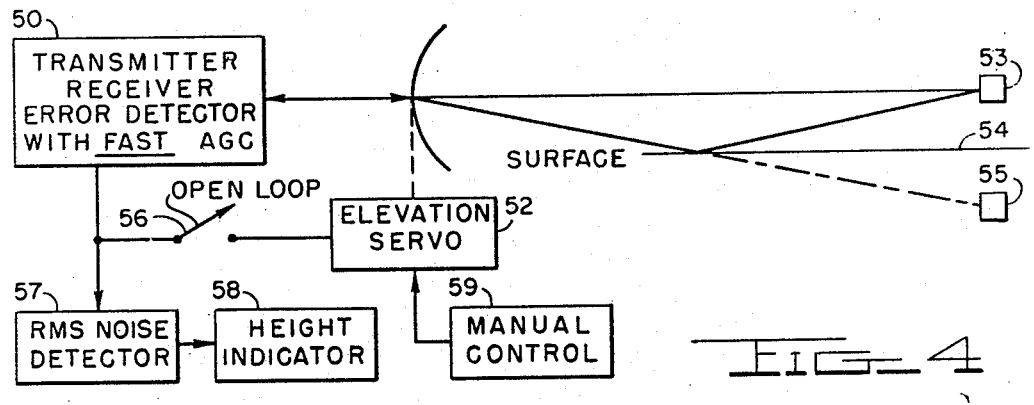

United States Patent Office 3,521,282
Patented July 21, 1970

3,521,282
OBJECT LOCATOR SYSTEM
Dean D. Howard, 8914 Oak Lane, Oxon Hill, Md.
20022, and Bernard L. Lewis, Winter Park, Fla.
(1239 Seminole Drive, Satellite Beach, Fla.
32935)
Filed Apr. 13, 1959, Ser. No. 806,191
Int. Cl. G01s 9/02; H01q 3/08
U.S. Cl. 343—7.4                                    7 Claims

ABSTRACT OF THE DISCLOSURE

The RMS value of the target noise is used to develop a bias signal which is applied to the antenna drive system to move the tracking point from an average location to a specific target when a plurality of targets are present within the radar beam.

---

The invention described herein may be manufactured and used by or for the Government of the United States of America for governmental purposes without the payment of any royalties thereon or therefor.

This invention relates to radar systems in general and in particular to tracking radar systems of high accuracy suitable for such purposes as missile guidance and gunfire direction, having improved individual target selection characteristics when operating with multiple targets such as a formation of aircraft in flight.

A tracking radar system is one having a highly directive antenna system, the beam of which can be automatically positioned in space to where it is at all times directed toward a distant target. Thus the radar beam can direct a beam rider type of guided missile traveling from a locality near the radar system to the distant target, or suitable indicators can be employed on the antenna from which the azimuth and elevation of the distant target may be readily obtained for other purposes such as gun laying.

When such a radar system as the foregoing operates upon a single distant target it is capable of considerably greater accuracy than when it operates upon a complex "target" configuration such as two or more aircraft flying with 50 foot lateral spacing at 25 miles range which in effect is not a single target but rather a composite of two separate targets both of which provide return energy that reaches the tracking radar system substantially simultaneously so that separation by the range gate is not possible. With such multiple targets, the actual tracking direction of the radar system wanders back and forth from one target to the other in a random manner introducing "tracking noise" which in effect appears as comparatively rapid motion of the radar antenna principally in the plane of the separation of the targets. When a beam rider type of missile attempts to follow such a noisy tracking beam it is possible for the missile to take an "averaging" path and pass harmlessly between the various components of the multiple "target" configuration.

The large tracking noise for multiple unresolved targets which effectively provide a single "target" is predictable from target angle noise theory where target angle noise is proportional to the radius of gyration of the distribution of reflecting area of the target. The two-unresolved-target situation, with reflecting areas concentrated at the extremes of the overall configuration, will have the maximum radius of gyration for a given overall configuration span and consequently the maximum angle noise. Furthermore, the average tracking point falls on the center of reflectivity of the "target" which for two unresolved targets of equal size would be the midpoint between the two targets. The resulting average tracking error from either of the two targets will be large.

Where the multiple targets are of unequal size the larger target is likely to be predominant in the return of energy to the radar system resulting in the production of an angle noise time function having a lack of symmetry. With such, the average tracking point is nearer the larger target but the noise peaks extend all the way to either target. The smaller target, being further from the average tracking point, will cause higher noise peaks in its direction. This property, as will be described in greater detail in a subsequent point in the specification, can be utilized to advantage to determine which of two targets is the larger and hence which might present a more attractive target for a guided missile.

It is an object of the present invention to provide apparatus for correcting the average tracking point of a radar system on multiple targets so that the average tracking point will coincide with one or the other of the aircraft in the formation and thereby increase the probability of kill on multiple target formations.

Other objects and many of the attendant advantages of this invention will be readily appreciated as the same becomes better understood by reference to the following detailed description when considered in connection with the accompanying drawings wherein;

FIGS. 2, 3 and 4 show alternate apparatus embodying the teachings of the present invention having particular advantages where the multiple targets are produced as a result of a single target flying close to the surface of the earth.

Figure 1:
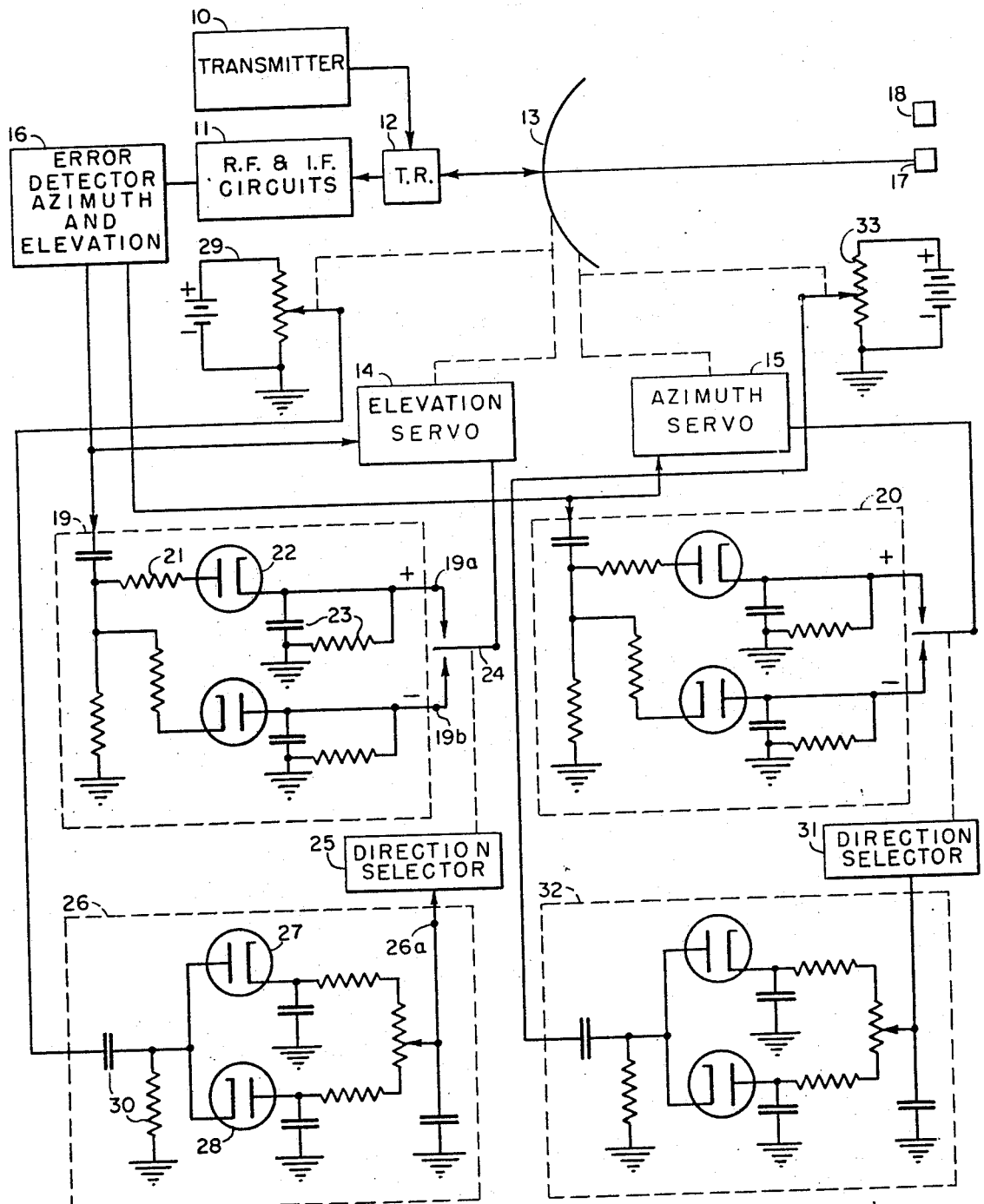
FIG. 1 shows a radar system employing the teachings of the present invention.

In accordance with the basic teachings of the present invention, apparatus is provided with develops a "bias" signal proportional to the root mean square value of the target noise to correct the average tracking point to the larger of a pair of targets or to either target if they are equal. The apparatus of the present invention also provides direction sense to indicate the direction of the larger target.

With reference now to FIG. 1 of the drawings, the apparatus shown therein is a simplified diagram of typical apparatus embodying the features of the present invention. This apparatus contains a number of more or less conventional components for tracking radar systems, namely a transmitter 10, receiver circuits 11, a transmit-receive switching device 12, and a directional antenna 13 positionable in elevation and azimuth by servo systems 14 and 15 in response to error signals derived by the error detector 16. These components are conventional in radar systems, such as disclosed in U.S. Pat. No. 2,929,056 granted on Mar. 15, 1960 to Robert M. Page. In this patent the outputs from rectifying mixers 36, 37 and 39, 40 are analogous to the two outputs of the detector 16. Although the presently described and illustrated embodiment of the invention is related to radar, it is to be understood, however, that the principles are equally applicable to other forms of detection systems, such as sonar. This elementary system operates by conventional techniques, such as simultaneous or sequential lobing to position antenna 13 such that it is maintained in the direction of a distant energy return object 17 at all times. Such a system can be highly accurate where a single distant energy return object 17 is encountered. However where a second energy return object 18 is disposed in close proximity to object 17 such that both produce substantial amounts of return energy to antenna 13, the antenna 13 will oscillate back and forth between objects 17 and 18 such that it points at some instants in time toward object 17 and at other instants toward object 18. This oscillation of the antenna 13 is called "tracking noise" and as previously mentioned it is proportional to the radius of gyration of the distribution of reflecting area of the combined "target" which in this case includes objects 17 and 18. If the two targets are of equal reflecting areas the average position of the antenna will fall between the two targets so that the average tracking error of both of the targets is large. The additional circuitry of FIG. 1 is included to provide apparatus for detecting the magnitude of this error for any target of the group so that the antenna may be caused to occupy an average position which is directed toward a selected one of the targets. Thus it will be possible to direct a guided missile toward the selected target of a group with a higher probability of kill than would result without the correction.

Noise detector 19 is connected to the elevation error output terminal of error detector 16 whereas noise detector 20 is connected to the azimuth error output terminal of error detector 16. The noise detectors 19 and 20 are similar, each containing two separate detector circuits arranged for opposite polarity portions of input signals. The circuit constants of the individual detectors are proportioned so that the filtered outputs as obtained at the terminals 19A and 19B represent the RMS value of the error signal existing on opposite polarity portions from the average value of the error signal. Each of the detector circuits typically includes a limiting resistor 21, a unilateral impedance device 22, a filter circuit 23 containing a capacitor and a resistor.

In accordance with the previous discussion the output signals at terminals 19A and 19B will be of a filtered D.C. nature having a magnitude proportional to the displacement of the reflecting areas on each side of the average tracking point of the antenna in the particular plane involved. Where the two areas are the same the magnitudes of the signals at terminals 19A and 19B will be approximately equal. The situation changes however if one of the reflecting areas is larger than the other in which case one or the other of the signals at the terminals 19A and 19B will be larger. The terminals 19A and 19B are selectively connected to the elevation servo 14 by means of a double throw switch 24 which may be operated to apply either terminals 19A or 19B to the servo 14. When a signal is so applied to the elevation servo 14 the zero point thereof is displaced in one direction or another causing the antenna 13 to be displaced toward one or the other of the targets 17 or 18.

Control of the direction of displacement by selection of the terminal 19A or 19B is provided by the switch 24 which operates through a direction selector 25 in response to signals obtained from the direction sensing circuit 26. The direction sensing circuit 26 contains a pair of opposed polarity detectors containing unilateral impedance devices 27 and 28 which are connected to a potentiometer 29 which in turn is driven by the elevation servo 14 to provide a D.C. signal proportional to peak excursions in dependency on the position of antenna 13 in the elevation plane. By means of a low impedance source and D.C. blocking circuit 30, containing a capacitance and a resistance for example, the unilateral impedance devices 27 and 28 provide an output signal at terminal 26A which will normally be zero for conditions where the antenna 13 is operating with an average tracking point which falls on the center of reflectivity of the multiple "target" which would result from a condition of equal reflectivity of the two targets 17 and 18. However, should either of the targets 17 or 18 have a greater reflectivity than the other, the antenna will occupy an average point which is predominantly in the direction of the larger target causing a shift in the average potential obtained from potentiometer 29 producing larger amplitude signals from one of the unilateral impedance devices 27, 28 or the other. This will cause the potential at the terminal 26A to become either plus or minus depending upon which of the objects 17 or 18 is the larger. If the servo has a narrow bandwidth then the low frequency portion of the untracked error detector output will be used as the input to 26.

With the apparatus described in the foregoing it would be convenient to provide an initial period of sensing whereby the potentials of the various rectifiers are stabilized prior to the actual insertion of the noise produced biasing voltage. Such would be conveniently obtained by placing the switch 24 in the intermediate position as shown in FIG. 1 in which case no bias signal is applied to the elevation servo 14. The result will be that the apparatus will operate in a conventional manner with the antenna 13 oscillating back and forth from one target to the other producing the normal target angle noise of prior art circuitry. When it is desired to obtain information as to the direction of a selected target, typically the larger of the pair, or one or the other should be reflecting areas for each be the same, the direction selector 25 will be operated manually or automatically to actuate switch 24 to contact either 19A or 19B to drive the antenna 13 to one side or the other relative to the normal average tracking point.

Target angle noise is still present of course in the output of the error detector 16 under biased conditions but the generation of the bias with closed loop tracking may be facilitated with the use of short time constant automatic gain control in the R.F. and I.F. circuits 11. If a long time constant automatic gain control is used with closed loop tracking, the noise output of the error detector is proportional to the radius of gyration of the "target" only when the antenna is pointed at the "target" center and the noise would increase with tracking error such as that caused by shifting of the average point to one of the targets or the other. This condition is avoided by the use of short time constant automatic gain control in the R.F. and I.F. circuits which will cause the output of the angle error detector to remain proportional to the "target" radius of gyration essentially independent of the tracking error itself. By closing the tracking loop one might expect that the error detector output will be distorted since the antenna will tend to move in a manner which will maintain zero error signal. The unresolved multiple "target" however has a very wide angle noise spectrum compared to a single target because of the rapid phase rates that exist between the echo signal from the individual targets. The angle noise spectrum will be spread to the range of six to ten or more cycles per second noise bandwidth as compared to one or two cycles per second normally experienced for a single target. This change in angle noise spectrum however does not affect the total RMS angle noise. Servo systems could follow noise components up to possibly a half-cycle per second which would leave for a multiple "target" at least 90% of the noise output power of the angle error detector 16 undistorted for the bias detectors. For single targets where the noise falls into the lower portion of the spectrum a large part of the angle noise will be tracked out. The low servo bandwidth results from the aerodynamic characteristic of the missile being guided which limits its response. Furthermore, servo systems of wider bandwith would not be practical because angle noise would cause a severe increase in tracking noise.

With short time constant automatic gain control and closed loop tracking the noise output of the angle error detector will therefore be substantially proportional to the radius of gyration of the "target" reflectivity for a multiple "target." The desired bias will be generated by a circuit detecting the RMS noise in the output of the angle error detector.

The noise detector 19 and direction detector 26 which have been described in connection with the elevation drive mechanism for antenna 13 are substantially duplicated by similar circuitry of components 20, 31, 32 and 33 for the azimuth drive of antenna 13. It is of course understood that if desired the orientation mechanism of antenna 13 could be operative in only a single plane and only a single noise detection and direction channel would be required.

It will be apparent that noise detectors 19 and 20 each furnish two signals. These signals are proportional both to the RMS values of the error signal existing on opposite polarity portions from the average value of the error signal and to the displacement of the reflecting areas on each side of the average tracking point of the antenna in the particular plane involved. One or the other of these signals may, by selective positioning of switches 24, be connected to the servo systems 14 and 15. The selected signals operate to shift the average position of antenna 13 toward one or the other of targets 17 and 18. The selective positioning of switches 24 may be made manually or may be automatically accomplished by selectors 25 and 31 under the respective control of sensing circuits 26 and 32. The switches 24 are controlled to shift the average position of antenna 13 toward the preferred target, ordinarily the larger of targets 17 and 18. The positions of switches 24 are also indicative of the directional variation of the preferred target.

The degree of effectiveness of the bias technique described in the foregoing is dependent upon the probability distribution of arrival points where the overall system could be typified as part of a device for guiding missiles from a launching site to a distant target. The use of bias on two unresolved targets gives a considerable increase in probability of a missile arriving within a lethal radius of one of them over the condition which would exist without the use of bias. When the target consists of three or more unresolved aircraft the bias may be of value but in some instances it will not be effective in increasing the probability of kill but even there it will not harm the missile operation or reduce the probability of kill. A typical situation could be visualized wherein three evenly spaced targets were involved. In such an instance it is apparent that a missile guided toward the average tracking point of the uncorrected system would have a high kill probability for the center target since that target will occupy the average of the composite reflecting area. Thus in such an instance it is not apparent that any improvement will result from the use of the bias technique. If the bias technique is utilized however, it will shift the average tracking point in the direction of one of the outermost targets increasing the kill probability upon that target, the result being that the overall kill probability is substantially the same with or without bias although a different individual target is involved. In many situations however the three targets are not disposed symmetrically namely where two of the targets are closer together than half the separation between the two outermost targets, the bias technique can displace the average tracking point toward the midpoint between the two targets which are located closest together providing an increase in the kill probability for these two individual targets. A similar situation as this latter described would exist where the targets are spaced by similar distances but are of dissimilar sizes.

For missile guidance it is important to realize that the reduction of total tracking noise is of considerable importance for accurate tracking. The power capacity of the missile for control of flight is necessarily limited by allowable weight and volume for batteries and the like. The target noise places a serious drain on this power source by causing continuous maneuvering as the apparent target seen by the radar shifts back and forth about the true target center. Multiple targets causing an increase in tracking noise further increase the drain on maneuvering capacity and thereby severely limit the effective missile range. The reduction of the total tracking noise power by biasing will result in a direct increase of available power capacity for maneuvering. It is also noteworthy that the missile directed by such a biased radar system toward one target out of two is aimed in the direction of the target it will retain in terminal guidance after resolution. In contrast, the unbiased missile is aimed between the target pair and must upon resolution maneuver toward the target it selects. At this critical moment, the problem of the power source for maneuvering is acute with the unbiased missile since it has been subject to more noisy tracking and it may not have the necessary power remaining for the final maneuver even if that maneuver is physically possible.

The foregoing discussion has been directed to an apparatus operating with a multiple target which is sufficiently removed from other objects or reflecting surfaces that the multiple target itself is the only object within the antenna response field. In the foregoing apparatus there has been no particular effort made to derive any information from the bias signal itself other than to use that signal as a means for correcting the average tracking point to one of the targets of a group. There are instances however where measurement of the actual magnitude of the bias signal as well as its polarity can yield very desirable results. Of particular importance in this regard is the low altitude radar problem wherein a low-flying plane for example is flying so close to the surface of the earth, land or sea, as to result in the radar antenna picking up direct return energy from the plane as well as return energy from the plane via reflection from the surface of the earth. Such a condition produces a virtual second target which appears to be below the surface of the earth, the result being a multiple unresolved "target" situation just as that discussed in connection with FIG. 1. Such a multiple "target" situation can be resolved with the apparatus of FIG. 1 to cause the average tracking point to fall on the plane itself rather than on the midpoint between the plane and the virtual target. In such a situation, measurement of the bias voltage will provide a direct indication of the evaluation angle of the plane above the surface of the earth which when analyzed in connection with the range of the plane can provide a direct indication of the altitude of the plane. Knowledge of such a variable is often very important for the most effective use of interception facilities.

The low-flying target and the virtual target differ from the multiple target situation in two major aspects. First, for radar tracking of a low-flying target the true target is always above the virtual target and no direction sensing is needed. Second, a correlation exists between the true target and the virtual target such that the noise falls in a low frequency region. Thus, either long averaging time must be used or the sampling time increased by such techniques as frequency diversity.

FIGS. 2, 3 and 4 show three ways in which height information may be obtained by measurement of the RMS noise in the radar error detector output when the radar is looking at the unresolved target 53 and virtual target 55 below the surface 54. The conventional radar 50 in FIG. 2 is operated in the slow AGC condition. Since with slow AGC the noise power is proportional to square of the target radius of gyration plus the square of any tracking error from the target center, the antenna must be pointed at the surface under the target by use of external information supplied by computer 59. The radar servo loop in elevation is opened by switch 56. The RMS noise detector 57 given a D.C. output proportional to the error detector output noise which is fed to a calibrated height indicator 58 or to computers for fire control, missile guidance, etc.

If the radar is operated with a fast AGC then the angle error detector output noise is proportional to the radius of gyration and independent of the tracking point as long as the target is within the radar antenna beamwidth. With the fast AGC the radar may track either closed loop with a narrow band servo 52 as shown in FIG. 3 with switch 56 closed, or open loop as shown in FIG. 4 with some external means of controlling the radar antenna elevation to maintain the target within the beam. The fast AGC is preferable because the antenna position is not critical under this condition.

Although slow and fast AGC are often more rigorously defined, as in page 431, column 1, volume 47, March 1959 Proceedings of the I.R.E., it is to be understood that for the purposes of this invention the described functional aspects of the AGC are primarily significant.

This technique would be equally applicable in the azimuth coordinate but the explanation is based on elevation since most problems exist in this plane.

Obviously many modifications and variations of the present invention are possible in the light of the above teachings. It is therefore to be understood that within the scope of the appended claims the invention may be practiced otherwise than as specifically described.

What is claimed is:

1. In a reflected energy object detector system, apparatus for differentiating between different return energy sources disposed in close proximity to each other such that the energy from the different sources is unresolved wherein the apparent direction of the sources of return energy is subject to substantial random variations relative to the average direction of the sources comprising, means for sensing the apparent direction of said sources, means connected to said sensing means for deriving first and second output signals correlative in sense to the average random variation from the average direction of the sources in opposing directions in a selected plane, and indicator means connected to said last named means and responsive to the amplitude of the output signals for indicating the correct direction of each return energy source.

2. In a pulse echo object detection system, apparatus for differentiating between different energy return objects disposed in close proximity to each other such that the echo energy from the different objects is unresolved wherein the apparent direction of the energy return objects is subject to substantial random variation relative to the average direction of the objects comprising means for sensing the apparent direction of said objects, means connected to said sensing means for deriving a first signal in amplitude proportion to the random variation of the apparent direction of the energy return objects in a selected plane, means connected to receive said first signal for separately deriving second and third signals in dependency on the peak amplitude of the first signal in each polarity relative to the average value thereof, and indicator means connected to said last named means and responsive to the second and third signals for indicating the directional variation of the energy return objects relative to the average direction.

3. In a pulse echo object detection system having a positionable directive radiator device, apparatus for differentiating between different energy return objects disposed in closed proximity to each other such that the echo energy from the different objects is unresolved wherein the apparent direction of the energy return objects is subject to substantial random variation relative to the average direction of the objects comprising, means for deriving a first signal in proportion to the random variation of the apparent direction of the energy return objects in a selected plane, means connected to receive said first signal for separately deriving second and third signals in dependency on the peak amplitudes of the first signal in each polarity from the average value thereof, and means responsive to a selected one of the second and third signals for displacing the direction of the radiator device in proportion to such one of the second and third signals.

4. In a radar system, apparatus for resolving multiple targets disposed at substantially the same range and in such close proximity as to prevent resolution on the basis of antenna beamwidth thereby providing a composite return signal comprising, means for measuring the random displacement of the apparent direction of receipt of the composite signal on opposite sides of the average direction thereof in a selected plane, and means responsive to said measuring means for orienting the antenna on a selected side of said average direction corresponding to the magnitude of the measured random displacement in the selected plane.

5. In a radar system having an antenna apparatus for resolving multiple targets disposed at substantially the same range and in such close proximity as to prevent resolution on the basis of antenna beamwidth thereby providing a composite return signal comprising, means for measuring the random displacement of the apparent direction of receipt of the composite signal on both sides of the average direction thereof in a selected plane, means for orienting the antenna in the selected plane in proportion to the magnitude of such displacement on one side of the average direction, means for producing a signal in dependency on the random displacement of the apparent direction of receipt of the composite signal in a selected plane, means for measuring the peak amplitude of said signal in each polarity relative to the average value thereof, means for selecting one of the two peak amplitudes, and means for applying the selected peak signal to said orienting means as a biasing signal whereby the average position of said radar antenna is aligned with one of the multiple targets.

6. In an automatic tracking radar system, apparatus for resolving multiple targets disposed at substantially the same range and in such close proximity as to prevent resolution on the basis of antenna beamwidth thereby providing a composite return signal comprising, means for producing a first signal in dependency on the random displacement of the apparent direction of receipt of the composite signal in a selected plane, means responsive to said first signal for producing first and second control signals of opposed polarity in proportion to the peak amplitudes of said first signal on first and second sides of the average thereof, means for producing a second signal in dependency on those movements of the radar antenna in tracking the composite return signal, means responsive to said second signal for producing a third control signal in polarity dependency upon the relationship of the peak amplitudes each side of the average value, means responsive to the polarity of the third signal for selecting one of the first and second control signals, means for shifting the antenna orientation in the selected plane in direction dependency on the polarity of an applied control signal, and means for applying the selected one of the first and second control signals to said last named means.

7. In an automatic tracking object locator system, apparatus for determining the height of an object which is disposed in such proximity to a surface that a virtual image thereof on the opposite side of the surface is not resolved from the object by the beamwidth of the locator system thereby providing a composite energy signal comprising, means for orienting the beam of the locator system in the direction of the surface in the region of the object, means for producing a signal in dependency on the random displacement of the apparent direction of receipt of the composite signal in a selected plane, means for indicating the peak amplitude of the signal whereby an indication of the elevation of the object above the surface is obtained.

References Cited

UNITED STATES PATENTS

| | | | |
|---|---|---|---|
| 3,130,402 | 4/1964 | Kuck | 343—7.4 |
| 2,804,612 | 8/1957 | Rogers | 343—7.3 |
| 3,078,453 | 2/1963 | McGillem | 343—16 |
| 3,005,938 | 10/1961 | Dilks | 343—14 |
| 3,090,952 | 5/1963 | Kuck | 343—16 |

RODNEY D. BENNETT, Primary Examiner

T. H. TUBBESING, Assistant Examiner